United States Patent
Yu et al.

(10) Patent No.: US 6,829,064 B1
(45) Date of Patent: Dec. 7, 2004

(54) INK REDUCTION USING DIFFUSED BITMAP MASKS

(75) Inventors: Ka Cheong Yu, Springboro, OH (US);
William R. Bitticker, Centerville, OH (US); Roger D. Parrett, Centerville, OH (US); Verlin D. Eblin, Springboro, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/562,292

(22) Filed: May 1, 2000

(51) Int. Cl.[7] .......................... G06K 15/00; H04N 1/405
(52) U.S. Cl. ..................................... 358/3.15; 358/3.06
(58) Field of Search ................................. 358/3.13–3.15, 358/1.9, 3.06–3.12, 2.1; 382/251–252, 270

(56) References Cited

U.S. PATENT DOCUMENTS

| | | | | |
|---|---|---|---|---|
| 5,684,933 A | * | 11/1997 | Nagafusa .................... 358/1.9 |
| 5,699,172 A | * | 12/1997 | Hattori et al. ............. 358/3.27 |
| 5,724,089 A | * | 3/1998 | Nagumo et al. ............ 347/247 |
| 5,729,270 A | * | 3/1998 | Wright et al. ............... 347/131 |
| 5,835,233 A | * | 11/1998 | Otsu et al. ................. 358/3.27 |
| 5,860,047 A | * | 1/1999 | Hernandez .................. 399/181 |

\* cited by examiner

*Primary Examiner*—Thomas D. Lee
*Assistant Examiner*—Stephen Brinich
(74) *Attorney, Agent, or Firm*—Barbara Joan Haushalter

(57) ABSTRACT

A technique is provided for reducing inking of image and text areas in an ink jet printing system. Initially, a shaded image/text multi-bit mask is provided. Half-toning, such as error diffusion, is applied to dither the shaded multi-bit mask to a one-bit mask. An image/text bitmap is loaded before applying a logical AND to the one-bit mask and the bitmap to generate a reduced ink image or text character. A character outline is created from the character bitmap. Finally, a logical OR is applied to the reduced ink character and the character outline to generate a reduced ink character with defined edges. This technique maintains fine detail in the image area as well as fine detail in small text characters.

11 Claims, 2 Drawing Sheets

INK REDUCTION USING DIFFUSED BITMAP MASKS

TECHNICAL FIELD

The present invention relates to ink jet printing and, more particularly, to a technique for reducing ink usage on the printed page while maintaining image quality.

BACKGROUND ART

Ink jet printing systems are known in which a print head defines one or more rows of orifices which receive an electrically conductive recording fluid, such as for instance a water base ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

When applying ink jet droplets to a print substrate, excessive ink can create an overly dark image and a loss in detail in the shadow areas. The image quality is dependent on not only the amount of ink being placed on the substrate, but also on the porosity of the print substrate. The combination of printing many or large ink drops on a printing surface that is not very porous can cause drying problems. In large solid printed areas, the extra ink saturates the page and before it can properly dry, the image transfers or offsets onto the other pages as the web is rewound. However, reducing a significant amount of ink from a graphic with large printed areas may have the undesired effect of destroying the fine details in other parts of the image, where small fonts may be used. Furthermore, installing higher performance dryers adds extra expense and maintenance to the system. Alternatively, altering images at the press can be impractical in a high speed ink jet printing system, and would entail changes to the complex and highly optimized data station.

It would be desirable then to be able to programmatically alter the images being printed during data preparation or pre-press stages.

SUMMARY OF THE INVENTION

The present invention proposes a technique for processing 1-bit monochrome digital images and fonts to reduce ink usage on the printed page while maintaining image quality.

In accordance with one aspect of the present invention, a percentage of ink droplets is removed from the printed page while maintaining sharply defined edges in all areas of the image. An enhanced error diffusion technique is used to tone down the ink usage. Edge detection is used to ensure that fine details remain sharp and are not lost. These image processing operations are efficiently applied to the original source image by means of a bitmap mask.

Other objects and advantages of the invention will be apparent from the following description, the accompanying drawings and the appended claims.

DETAILED DESCRIPTION OF THE PREFERRED EMBODIMENTS

Figure 1:
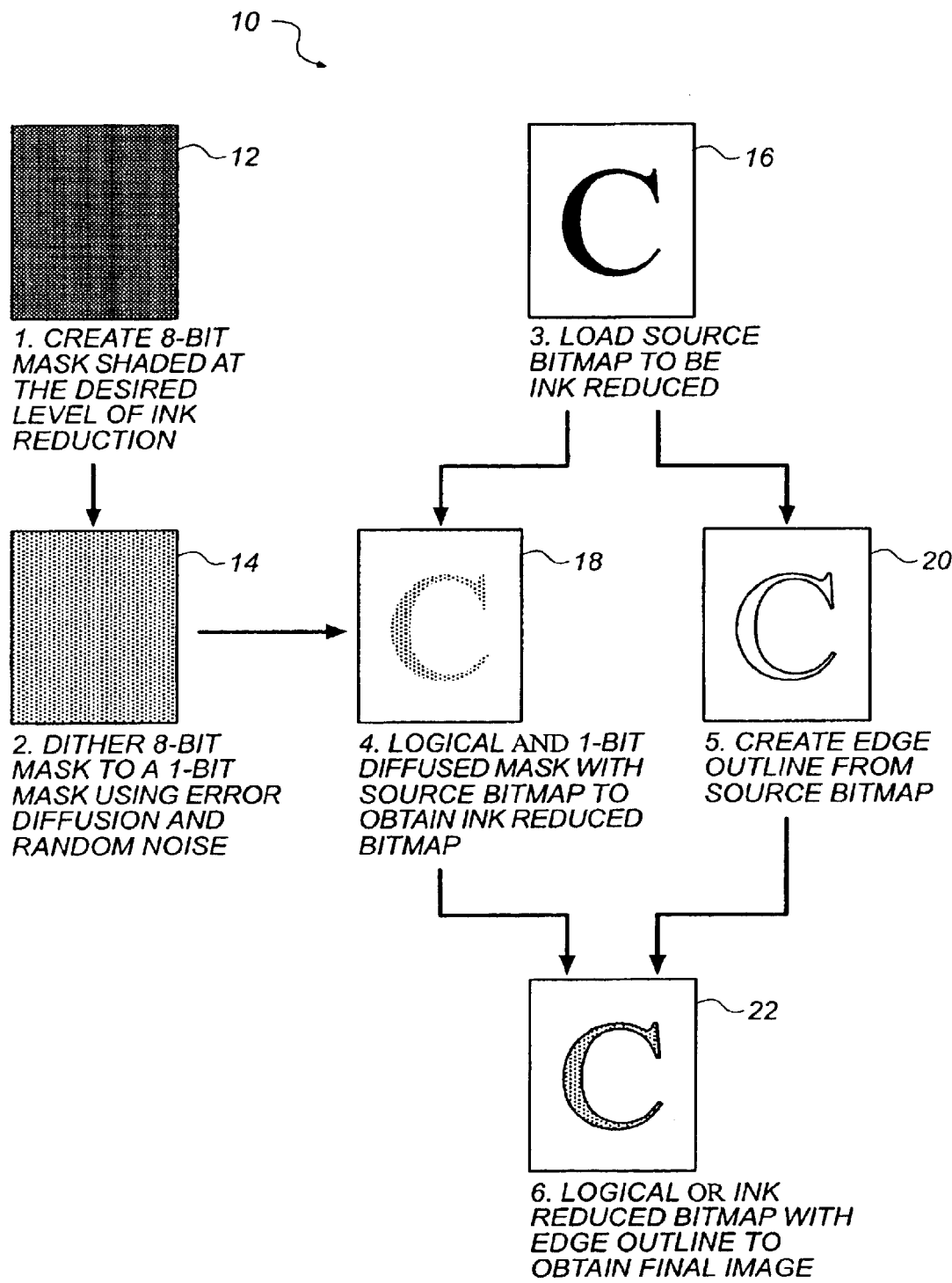
FIG. 1 is a block diagram to illustrate the steps for achieving the technique of the present invention.

To reduce the amount of ink used to print text and image areas, it is desirable to print the text or image at a density or gray scale level less than 100%. For example, if a 20% ink reduction is desired, the printed characters or image areas should have a density of 205 on a 256 gray level (8 bit) scale. While this could be achieved by directly half-toning the characters, the present invention produces superior results both in terms of print quality and processing time.

The invention is described herein as being applied to characters, with the characters being illustrated in the drawing as text characters for purposes of illustration only. The term character as used herein, however, applies to images as well as text, and the use of text characters is not to be construed as limiting the application of the invention. It will be understood by those skilled in the art that the teachings of the present invention can be readily applied to graphic images and image areas, as well as text characters, without departing from the scope of the invention, which encompasses text characters as well as graphic image characters.

Rather than directly apply a half-tone algorithm to each of the printed characters or to the character or image set, the present invention proposes applying an error diffusion, by using a character or image mask. This character mask is a bit-mapped block having the desired density level to which each bit-mapped character in the font set will be compared. The diffused mask is applied to the entire source image. In a preferred embodiment, for best results, the character mask would typically be larger in all directions than any of the characters in the font set. Alternatively, a series of smaller masks can be tiled. Furthermore, the technique of the present invention can be adjusted so that ink is reduced only from the interior of the characters, maintaining the edge definition critical to good print quality. This results in reducing the ink usage rates for larger image areas and larger text sizes, with no effect on small images and text, as small images and text more typically need all of the drops to maintain print quality. Hence, inking can be reduced in large or small areas, with no effect on the edges within the image, especially in areas of fine detail In accordance with the present invention, the application of bitmaps masks is faster and more efficient than applying math-intensive error diffusion to each character in the character set, since the mask can be created once and reused, which is faster than error diffusing each character individually. Furthermore, a different mask for each color plane can be used, to avoid overprinting pixels from different color planes.

Referring to FIG. 1, a block diagram 10 is illustrated to show the steps for achieving the ink reduction technique of the present invention. In block 12, a shaded character mask is created. This mask will correspond to the desired darkness or density of the ink reduced characters. For the example of a 20% ink reduction, the density level for the shaded character mask would be 205 in 256 gray level scale. This shaded rectangular block is then converted to a bit-mapped character mask 14 with one bit density level. While any half-tone algorithm could be employed, error-diffusion is the preferred half-toning method. At block 16, the character bitmap is loaded, for example, with the character "C". The character bitmap from block 16 and the dithered half-tone version of block 14 are submitted to a logical AND to form the reduced ink character of block 18.

Figure 2A:
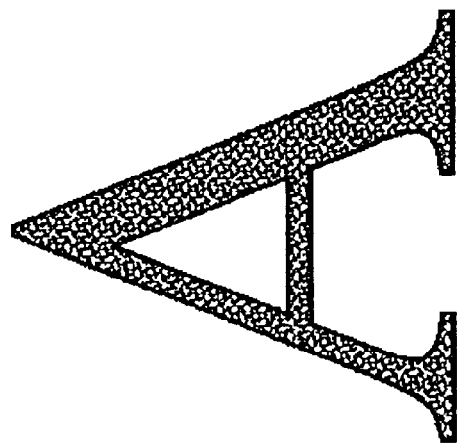
FIGS. 2A and 2B and 3A and 3B illustrate how the technique of the present invention reduces ink in a printed character, comparing lack of edge definition of the character of FIGS. 2A and 3A to the edge-defined character of FIGS. 2B and 3B.
Figure 3A:
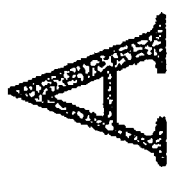
Figure 2B:
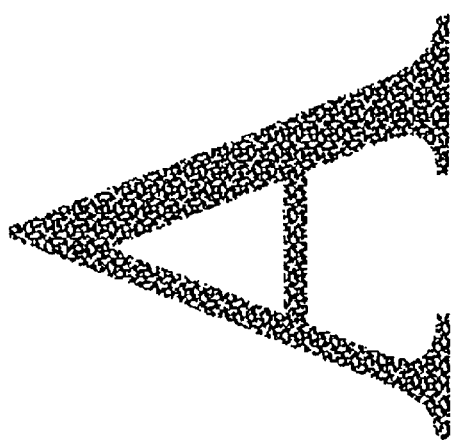
Figure 3B:
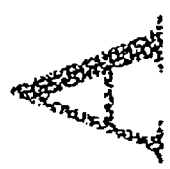

The resulting bit-mapped ink reduced characters have been found to lack aesthetic appeal. This is due to the half-toning producing holes along the edges, as seen in the "A" characters of FIGS. 2A and 3A. Those "A" are denoted as lacking edges. To overcome this problem, any suitable existing edge detection algorithm is applied to the original character bit map to produce, for example, an edge profile bit map. As shown in FIG. 1, the edge detection algorithm is applied to the character of block 16 to create a character outline, as illustrated in block 20. Then, a logical OR is applied to the character outline bit map of block 20 and the reduced ink character bit map of block 18, to form a reduced ink character with defined edges, in accordance with the present invention, as illustrated in block 22. The result is a much more pleasing character, as illustrated by the "A" characters of FIGS. 2B and 3B, which have defined edges. The fine details are added back in over the entire source bitmap. Edge detection, specifically, automatically gives fine details where there are lots of transitions between on and off pixels in very thin strokes. Furthermore, the edge can be defined to be any thickness, including zero, depending on the application and print quality desired.

Without application of the present invention, visually objectionable ragged edges will be produced if inking is reduced on the edges of text and images, resulting in loss of detail. The character edge can be defined as a stroke of only one pixel in thickness, or as several pixels in thickness. If the edge is defined as one pixel, then text with strokes of one or two pixels will not be affected by the ink reduction and will produce sharp, saturated text strokes. Likewise, an edge definition of two pixels would have no effect on text consisting of strokes up to four pixels maximum. Very large text and image areas would have reduced ink within the interiors, and not at the edges, where sharp detail is maintained.

While other halftone algorithms such as ordered dithers could have been used for this application, it is well known that error diffusion provides more gray scale levels than most simple ordered dither patterns. The use of the error diffusion process provides this invention with the ability make smaller incremental changes in ink reduction than if common ordered dither algorithms were used. Error diffusion, however, is a much slower half-toning algorithm than many of the ordered dither methods. Applying the error diffusion to one larger mask region is much faster than applying it individually to a large number of characters. As a result of applying the error diffusion to only one mask, rather than individually to each character in a character set, the relative slowness of the error diffusion is not an issue.

It is desirable to remove a certain percentage of ink droplets while retaining the highest image quality possible. Standard error diffusion techniques such as is illustrated by block 14 can introduce visual artifacts in the image. In the lighter gray tones in highlight areas, the drastically reduced number of dots may not disperse randomly enough. This lack of randomness may form noticeable, undesired, patterns that weave through the image. These patterns can be reduced or eliminated by adding some random noise to the density level prior to the error diffusion. A 3% of full scale random noise level has been found to be a desirable level. This is know as applying a random noise threshold to the error diffusion.

The invention has been described in detail with particular reference to certain preferred embodiments thereof, but it will be understood that modifications and variations can be effected within the spirit and scope of the invention.

We claim:

1. A method for reducing inking of characters in an ink jet printing system comprising the steps of:

providing a shaded character multi-bit mask;

applying an error diffusion to dither the shaded character multi-bit mask to a one-bit mask;

loading a character bitmap;

applying a logical AND to the one-bit mask and the character bitmap to generate a reduced ink character;

creating a character outline from the character bitmap; and applying a logical OR to the reduced ink character and the character outline to generate a reduced ink character with defined edges.

2. A method as claimed in claim 1 wherein the step of applying an error diffusion further comprises the step of employing a random noise threshold.

3. A method as claimed in claim 1 wherein the step of applying an error diffusion comprises the step of applying an error diffusion over an area covering the character.

4. A method as claimed in claim 3 wherein the step of applying an error diffusion comprises the step of applying an error diffusion over an area greater than the area covering the character.

5. A method as claimed in claim 1 wherein the shaded character multi-bit mask is reusable.

6. A method for reducing inking of a printed image from an ink jet printing system comprising the steps of:

providing a source image covering a source image area;

applying a diffused bitmap to at least the source image area to generate a diffused source image, by applying an error diffusion over an area covering the printed image;

creating a source image area outline from the source image;

adding the source image area outline back on the diffused source image to generate a reduced ink image that retains edge detail.

7. A method as claimed in claim 6 wherein the step of applying a diffused bitmap comprises the steps of:

providing a shaded character multi-bit mask;

applying half-toning to dither the shaded character multi-bit mask to a one-bit mask;

loading a character bitmap; and applying a logical AND to the one-bit mask and the character bitmap to generate a reduced ink character.

8. A method as claimed in claim 7 wherein the step of applying a diffused bitmap comprises the step of employing a random noise threshold.

9. A method as claimed in claim 6 wherein the step of creating a source image area outline from the source image comprises the steps of:

loading a character bitmap; and creating a character outline from the character bitmap using edge detection.

10. A method as claimed in claim 6 wherein the step of adding the source image area outline back on the diffused source image to generate a reduced ink image that retains edge detail comprises the step of applying a logical OR to the reduced ink character and the character outline to generate a reduced ink character with defined edges.

11. A method as claimed in claim 6 wherein the step of applying an error diffusion comprises the step of applying an error diffusion over an area greater than the area covering the printed image.

\* \* \* \* \*